United States Patent
Noyes

(10) Patent No.: US 10,466,966 B2
(45) Date of Patent: *Nov. 5, 2019

(54) SYSTEMS AND METHODS TO ENABLE IDENTIFICATION OF DIFFERENT DATA SETS

(71) Applicant: Micron Technology, Inc., Boise, ID (US)

(72) Inventor: Harold B Noyes, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/017,387

(22) Filed: Jun. 25, 2018

(65) Prior Publication Data

US 2018/0307463 A1    Oct. 25, 2018

Related U.S. Application Data

(63) Continuation of application No. 12/325,982, filed on Dec. 1, 2008, now Pat. No. 10,007,486.

(51) Int. Cl.
*G06F 7/02* (2006.01)
*G06F 5/06* (2006.01)

(52) U.S. Cl.
CPC ............... *G06F 7/02* (2013.01); *G06F 5/06* (2013.01); *G06F 2207/025* (2013.01)

(58) Field of Classification Search
USPC ......................................................... 707/758
See application file for complete search history.

(56) References Cited

U.S. PATENT DOCUMENTS

| | | |
|---|---|---|
| 5,300,830 A | 4/1994 | Hawes |
| 5,331,227 A | 7/1994 | Hawes |
| 5,524,065 A | 6/1996 | Yagasaki |
| 5,841,722 A | 11/1998 | Willenz |
| 6,240,003 B1 | 5/2001 | McElroy |
| 6,275,861 B1 | 8/2001 | Chaudri et al. |
| 6,777,979 B1 | 8/2004 | Zhu et al. |
| 6,880,087 B1 | 4/2005 | Carter |

(Continued)

FOREIGN PATENT DOCUMENTS

| | | |
|---|---|---|
| CN | 1897103 | 1/2007 |
| CN | 1917553 | 2/2007 |

(Continued)

OTHER PUBLICATIONS

Beesley, K. R.; Arabic Morphology Using Only Finite-State Operations; Xerox Research Centre Europe; pp. 50-57.

(Continued)

*Primary Examiner* — Muluemebet Gurmu
(74) *Attorney, Agent, or Firm* — Fletcher Yoder, P.C.

(57) ABSTRACT

Systems and methods are provided, such as those that enable identification of data flows and corresponding results in a pattern-recognition processor. In one embodiment, a system may include the pattern-recognition processor and a flow identification register, wherein a unique flow identifier for each data flow is stored in the register. The system may include a results buffer that stores the results data and the flow identifier for each data flow, so that the results data may be related to a specific data flow.

19 Claims, 13 Drawing Sheets

(56) References Cited

U.S. PATENT DOCUMENTS

| | | |
|---|---|---|
| 6,906,938 B2 | 6/2005 | Kaginele |
| 6,944,710 B2 | 9/2005 | Regev et al. |
| 7,013,394 B1 | 3/2006 | Lingafelt et al. |
| 7,089,352 B2 | 8/2006 | Regev et al. |
| 7,146,643 B2 | 12/2006 | Dapp et al. |
| 7,392,229 B2 | 6/2008 | Harris et al. |
| 7,917,684 B2 | 3/2011 | Noyes et al. |
| 7,953,221 B2 | 5/2011 | Feghali et al. |
| 7,970,964 B2 | 6/2011 | Noyes |
| 8,140,780 B2 | 3/2012 | Noyes |
| 8,209,521 B2 | 6/2012 | Noyes et al. |
| 8,402,188 B2 | 3/2013 | Noyes et al. |
| 8,843,523 B2 | 9/2014 | Noyes |
| 8,938,590 B2 | 1/2015 | Noyes et al. |
| 9,164,945 B2 | 10/2015 | Noyes |
| 9,348,784 B2 | 5/2016 | Noyes |
| 9,639,493 B2 | 5/2017 | Noyes |
| 2006/0089988 A1 | 4/2006 | Davie et al. |
| 2007/0075878 A1 | 4/2007 | Furodet et al. |
| 2007/0127482 A1 | 6/2007 | Harris et al. |
| 2007/0282833 A1 | 12/2007 | McMillen et al. |
| 2008/0071779 A1* | 3/2008 | Mammen .......... G06F 17/30516 |
| 2008/0262991 A1* | 10/2008 | Kapoor .................. G06F 21/55 706/20 |
| 2010/0138575 A1 | 6/2010 | Noyes |
| 2010/0174887 A1 | 7/2010 | Pawlowski |
| 2011/0055425 A1* | 3/2011 | Patel ...................... H04L 45/00 709/238 |

FOREIGN PATENT DOCUMENTS

| | | |
|---|---|---|
| CN | 1012237415 | 8/2008 |
| EP | 0380294 | 8/1990 |
| JP | 2000307642 | 11/2000 |
| JP | 2004072512 | 3/2004 |
| JP | 2005-348415 | 12/2005 |
| JP | 2006-506853 | 2/2006 |
| JP | 200848080 | 2/2008 |

OTHER PUBLICATIONS

Bird, S. et al.; One-Level Phonology: Autosegmental Representations and Rules as Finite Automata; Association for Computational Linguistics; University of Edinburgh; vol. 20; No. 1; pp. 55-90; 1994.

Bispo, J. et al.; Regular Expression Matching for Reconfigurable Packet Inspection; IEEE.

Bispo, J. et al.; Synthesis of Regular Expressions Targeting FPGAs: Current Status and Open Issues; IST/INESC-ID, Libson, Portugal; pp. 1-12.

Brodie, B. et al.; A scalable Architecture for High-Throughput Regular-Expression Pattern Matching; Exegy Inc.; pp. 1-12.

Clark, C.; Design of Efficient FPGA Circuits for Matching Complex Patterns in Network Intrusion Detection Systems (Master of Science Thesis); Georgia Institute of Technology; pp. 1-56; Dec. 2003.

Clark, C.; A Unified Model of Pattern-Matching Circuits for Field-Programmable Gate Arrays [Doctoral Dissertation]; Georgia Institute of Technology; pp. 1-177; 2006.

Clark, C. et al.; Scalable Pattern Matching for High Speed Networks; Proceedings of the 12$^{th}$ Annual IEEE symposium on Field-Programmable Custom Computing Machines (FCCM'04);Georgia Institute of Technology; pp. 1-9; 2004.

Clark, C. et al.; A Unified Model of Pattern-Matching Circuit Architectures; Tech Report GIT-CERCS-05-20;Georgia Institute of Technology; pp. 1-17.

Fide; S.; String Processing in Hardware; Scalable Parallel and Distributed Systems Lab; Proceedings of the 12$^{th}$ Annual IEEE symposium on Field-Programmable Custom Computing Machines (FCCM'04);School of Electrical and Computer Engineering; Georgia Institute of Technology; pp. 1-9; 2004.

Fisk, M. et al.; Applying Fast String Matching to Intrusion Detection; Los Alamos National Laboratory; University of California San Diego; pp, 1-21.

Korenek, J.; Traffic Scanner-Hardware Accelerated Intrusion Detection System; http://www.liberouter.org/ ;2006.

Kumar, S. et al.; Curing Regular Expressions matching Algorithms from Insomnia, Amnesia, and Acaluia; Department of Computer Science and Engineering; Washington University in St. Louis; pp. 1-17; Apr. 27, 2007.

Lipovski, G.; Dynamic Systolic Associative Memory Chip; IEEE; Department of Electrical and Computer Engineering; University of Texas at Austin; pp. 481-492; 1990.

Lin, C. et al.; Optimization of Pattern. Matching Circuits for Regular Expression on FPGA; IEEE Transactions on Very Large Scale integrations Systems; vol. 15, No. 12, pp. 1-6; Dec. 2007.

Schultz, K. et al.; Fully Parallel Integrated CAM/RAM Using Preclassification to Enable Large Capacities; IEEE Journal on Solid-State Circuits; vol. 31; No. 5; pp. 689-699; May 1996.

Shafai, F. et al.; Fully Parallel 30-MHz, 2.5-Mb CAM; IEEE Journal of Solid-State Circuits, vol. 33; No. 11; pp. 1690-1696; Nov. 1998.

Sidhu, R. et al.; Fast Regular Expression Pattern Matching using FPGAs; Department of EE-Systems; University of Southern California; pp. 1-12.

Wada, T.; Multiobject Behavior Recognition Event Driven Selective Attention Method; IEEE; pp. 1-16; 2000.

Yu, F.; High Speed Deep Packet Inspection with Hardware Support; Electrical Engineering and Computer Sciences; University of California at Berkeley; pp. 1-217; Nov. 22, 2006.

Freescale and Kaspersky® Accelerated Antivirus Solution Platform for OEM Vendors; Freescale Semiconductors Document; pp. 1-16; 2007.

Hurson A. R.; A VLSI Design for the Parallel Finite State Automaton and Its Performance Evaluation as a Hardware Scanner; International Journal of Computer and Information Sciences, vol. 13, No. 6. 1984, 18 pgs.

Chinese Application No. 200980148391.9 Office Action dated Jul. 25, 2013 and translation, 24 pgs.

JP Application No. 2011-538632 Office Action dated Dec. 5, 2013 and translation, 17 pgs.

JP Application No. 2011-53802 Office Action dated Aug. 12, 2014 and translation, 9pgs.

CN Application No. 200980148391.9 Office Action dated Oct. 20, 2014, 42 pgs.

EP Application No. 09793370.9 Communication Pursuant to Article 94(3) dated Nov. 13, 2014, 7 pgs.

EP Application No. 09793370.9 Summons to Oral Proceedings dated Feb. 2, 2017; 9 pgs.

U.S. Appl. No. 60/652,738, filed Feb. 12, 2005, Harris et al.

\* cited by examiner

SYSTEMS AND METHODS TO ENABLE IDENTIFICATION OF DIFFERENT DATA SETS

CROSS-REFERENCE TO RELATED APPLICATIONS

The present application is a continuation of U.S. application Ser. No. 12/325,982, entitled "Systems and Methods to Enable Identification of Different Data Sets," and filed Dec. 1, 2008, now U.S. Pat. No. 10,007,486 which issued on Jun. 26, 2018, the entirety of which is incorporated by reference herein for all purposes.

BACKGROUND OF THE INVENTION

1. Field of the Invention

Embodiments of the invention relate generally to pattern-recognition processors and, more specifically, in certain embodiments, to management of data and results in pattern-recognition processors.

2. Description of the Related Art

In the field of computing, pattern recognition tasks are increasingly challenging. Ever larger volumes of data are transmitted between computers, and the number of patterns that users wish to identify is increasing. For example, spam or malware are often detected by searching for patterns in a data stream, e.g., particular phrases or pieces of code. The number of patterns increases with the variety of spam and malware, as new patterns may be implemented to search for new variants. Searching a data stream for each of these patterns can form a computing bottleneck. Often, as the data stream is received, it is searched for each pattern, one at a time. The delay before the system is ready to search the next portion of the data stream increases with the number of patterns. Thus, pattern recognition may slow the receipt of data.

A device performing the pattern recognition function may receive one or more data streams over a packet based network, such as Transmission Control Protocol/Internet Protocol (TCP/IP). However, packets of a data stream received over such a network may be mixed or "multiplexed" with other packets from other data streams. Additionally, the packets may not be received in order. Further, after processing the packets of the data streams, any results output by the device may not be identified with each data stream. In some cases, hundreds of data streams may be received and processed by the device. Identifying and tracking each data stream may use a significant amount of resources and may impact processing throughput and latency of the device.

DETAILED DESCRIPTION OF SPECIFIC EMBODIMENTS

Figure 1:
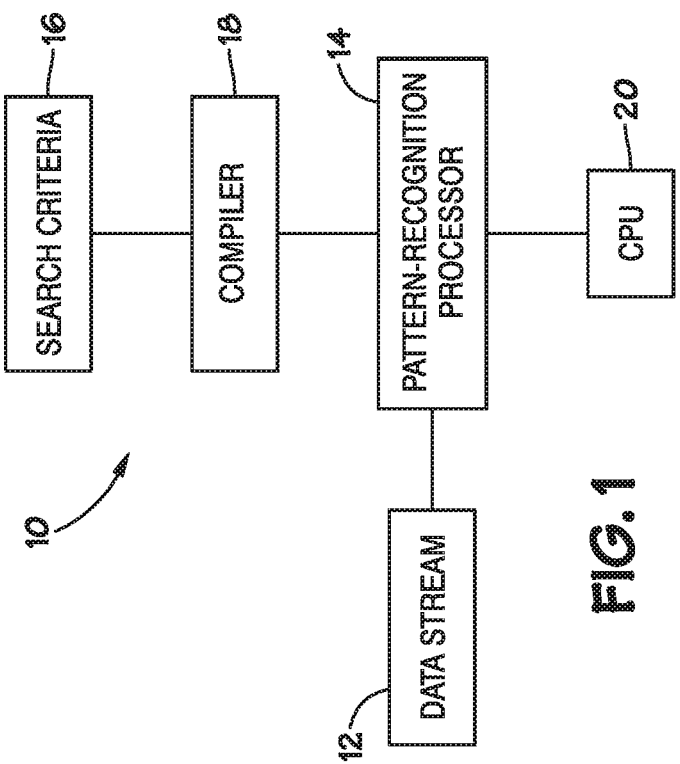
FIG. 1 depicts an example of system that searches a data stream.

FIG. 1 depicts an example of a system 10 that searches a data stream 12. The system 10 may include a pattern-recognition processor 14 that searches the data stream 12 according to search criteria 16.

Each search criterion may specify one or more target expressions, i.e., patterns. The phrase "target expression" refers to a sequence of data for which the pattern-recognition processor 14 is searching. Examples of target expressions include a sequence of characters that spell a certain word, a sequence of genetic base pairs that specify a gene, a sequence of bits in a picture or video file that form a portion of an image, a sequence of bits in an executable file that form a part of a program, or a sequence of bits in an audio file that form a part of a song or a spoken phrase.

A search criterion may specify more than one target expression. For example, a search criterion may specify all five-letter words beginning with the sequence of letters "cl", any word beginning with the sequence of letters "cl", a paragraph that includes the word "cloud" more than three times, etc. The number of possible sets of target expressions is arbitrarily large, e.g., there may be as many target expressions as there are permutations of data that the data stream could present. The search criteria may be expressed in a variety of formats, including as regular expressions, a programming language that concisely specifies sets of target expressions without necessarily listing each target expression.

Each search criterion may be constructed from one or more search terms. Thus, each target expression of a search criterion may include one or more search terms and some target expressions may use common search terms. As used herein, the phrase "search term" refers to a sequence of data that is searched for, during a single search cycle. The sequence of data may include multiple bits of data in a binary format or other formats, e.g., base ten, ASCII, etc. The sequence may encode the data with a single digit or multiple digits, e.g., several binary digits. For example, the pattern-recognition processor 14 may search a text data stream 12 one character at a time, and the search terms may specify a set of single characters, e.g., the letter "a", either the letters "a" or "e", or a wildcard search term that specifies a set of all single characters.

Search terms may be smaller or larger than the number of bits that specify a character (or other grapheme—i.e., fundamental unit—of the information expressed by the data stream, e.g., a musical note, a genetic base pair, a base-10 digit, or a sub-pixel). For instance, a search term may be 8 bits and a single character may be 16 bits, in which case two consecutive search terms may specify a single character.

The search criteria 16 may be formatted for the pattern-recognition processor 14 by a compiler 18. Formatting may include deconstructing search terms from the search criteria. For example, if the graphemes expressed by the data stream 12 are larger than the search terms, the compiler may deconstruct the search criterion into multiple search terms to search for a single grapheme. Similarly, if the graphemes expressed by the data stream 12 are smaller than the search terms, the compiler 18 may provide a single search term, with unused bits, for each separate grapheme. The compiler 18 may also format the search criteria 16 to support various regular expressions operators that are not natively supported by the pattern-recognition processor 14.

The pattern-recognition processor 14 may search the data stream 12 by evaluating each new term from the data stream 12. The word "term" here refers to the amount of data that could match a search term. During a search cycle, the pattern-recognition processor 14 may determine whether the currently presented term matches the current search term in the search criterion. If the term matches the search term, the evaluation is "advanced", i.e., the next term is compared to the next search term in the search criterion. If the term does not match, the next term is compared to the first term in the search criterion, thereby resetting the search.

Each search criterion may be compiled into a different finite state machine in the pattern-recognition processor 14. The finite state machines may run in parallel, searching the data stream 12 according to the search criteria 16. The finite state machines may step through each successive search term in a search criterion as the preceding search term is matched by the data stream 12, or if the search term is unmatched, the finite state machines may begin searching for the first search term of the search criterion.

The pattern-recognition processor 14 may evaluate each new term according to several search criteria, and their respective search terms, at about the same time, e.g., during a single device cycle. The parallel finite state machines may each receive the term from the data stream 12 at about the same time, and each of the parallel finite state machines may determine whether the term advances the parallel finite state machine to the next search term in its search criterion. The parallel finite state machines may evaluate terms according to a relatively large number of search criteria, e.g., more than 100, more than 1000, or more than 10,000. Because they operate in parallel, they may apply the search criteria to a data stream 12 having a relatively high bandwidth, e.g., a data stream 12 of greater than or generally equal to 64 MB per second or 128 MB per second, without slowing the data stream. In some embodiments, the search-cycle duration does not scale with the number of search criteria, so the number of search criteria may have little to no effect on the performance of the pattern-recognition processor 14.

When a search criterion is satisfied (i.e., after advancing to the last search term and matching it), the pattern-recognition processor 14 may report the satisfaction of the criterion to a processing unit, such as a central processing unit (CPU) 20. The central processing unit 20 may control the pattern-recognition processor 14 and other portions of the system 10.

The system 10 may be any of a variety of systems or devices that search a stream of data. For example, the system 10 may be a desktop, laptop, handheld or other type of computer that monitors the data stream 12. The system 10 may also be a network node, such as a router, a server, or a client (e.g., one of the previously-described types of computers). The system 10 may be some other sort of electronic device, such as a copier, a scanner, a printer, a game console, a television, a set-top video distribution or recording system, a cable box, a personal digital media player, a factory automation system, an automotive computer system, or a medical device. (The terms used to describe these various examples of systems, like many of the other terms used herein, may share some referents and, as such, should not be construed narrowly in virtue of the other items listed.)

The data stream 12 may be one or more of a variety of types of data streams that a user or other entity might wish to search. For example, the data stream 12 may be a stream of data received over a network, such as packets received over the Internet or voice or data received over a cellular network. The data stream 12 may be data received from a sensor in communication with the system 10, such as an imaging sensor, a temperature sensor, an accelerometer, or the like, or combinations thereof. The data stream 12 may be received by the system 10 as a serial data stream, in which the data is received in an order that has meaning, such as in a temporally, lexically, or semantically significant order. Or the data stream 12 may be received in parallel or out of order and, then, converted into a serial data stream, e.g., by reordering packets received over the Internet. In some embodiments, the data stream 12 may present terms serially, but the bits expressing each of the terms may be received in parallel. The data stream 12 may be received from a source external to the system 10, or may be formed by interrogating a memory device and forming the data stream 12 from stored data.

Depending on the type of data in the data stream 12, different types of search criteria may be chosen by a designer. For instance, the search criteria 16 may be a virus definition file. Viruses or other malware may be characterized, and aspects of the malware may be used to form search criteria that indicate whether the data stream 12 is likely delivering malware. The resulting search criteria may be stored on a server, and an operator of a client system may subscribe to a service that downloads the search criteria to the system 10. The search criteria 16 may be periodically updated from the server as different types of malware emerge. The search criteria may also be used to specify undesirable content that might be received over a network, for instance unwanted emails (commonly known as spam) or other content that a user finds objectionable.

The data stream 12 may be searched by a third party with an interest in the data being received by the system 10. For example, the data stream 12 may be monitored for text, a sequence of audio, or a sequence of video that occurs in a copyrighted work. The data stream 12 may be monitored for utterances that are relevant to a criminal investigation or civil proceeding or are of interest to an employer.

The search criteria 16 may also include patterns in the data stream 12 for which a translation is available, e.g., in memory addressable by the CPU 20 or the pattern-recognition processor 14. For instance, the search criteria 16 may each specify an English word for which a corresponding Spanish word is stored in memory. In another example, the search criteria 16 may specify encoded versions of the data stream 12, e.g., MP3, MPEG 4, FLAC, Ogg Vorbis, etc., for which a decoded version of the data stream 12 is available, or vice versa.

The pattern recognition processor 14 may be hardware that is integrated with the CPU 20 into a single component (such as a single device) or may be formed as a separate component. For instance, the pattern-recognition processor 14 may be a separate integrated circuit. The pattern-recognition processor 14 may be referred to as a "co-processor" or a "pattern-recognition co-processor".

Figure 2:
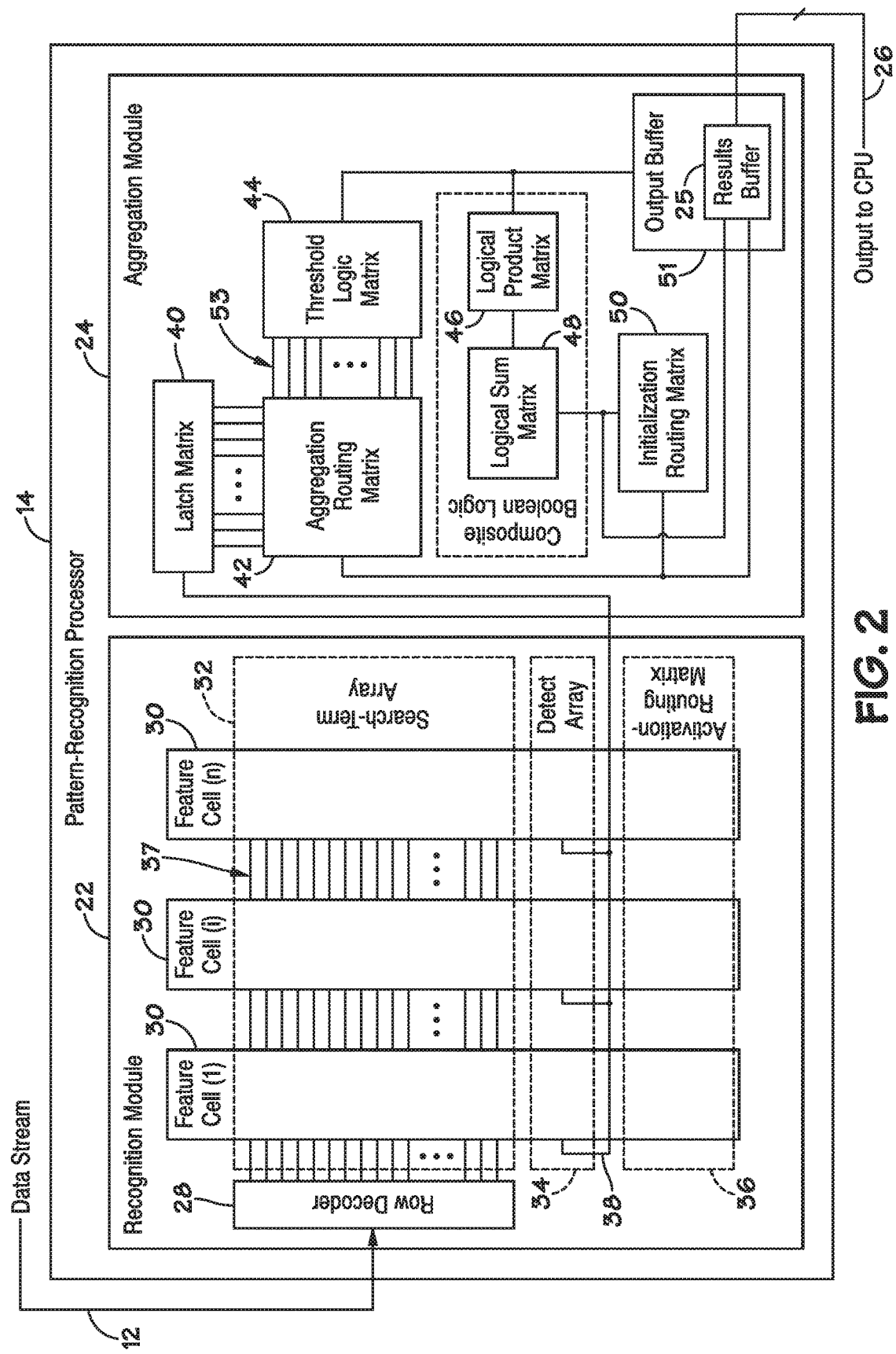
FIG. 2 depicts an example of a pattern-recognition processor in the system of FIG. 1.

FIG. 2 depicts an example of the pattern-recognition processor 14. The pattern-recognition processor 14 may include a recognition module 22 and an aggregation module 24 having an output buffer 51. The output buffer 51 may include a results buffer 25. The recognition module 22 may be configured to compare received terms to search terms, and both the recognition module 22 and the aggregation module 24 may cooperate to determine whether matching a term with a search term satisfies a search criterion. The results buffer 25 may buffer results data from the other portions of the patter-recognition processor 14, as will be described further below with regard to FIG. 14.

The recognition module 22 may include a row decoder 28 and a plurality of feature cells 30. Each feature cell 30 may specify a search term, and groups of feature cells 30 may form a parallel finite state machine that forms a search criterion. Components of the feature cells 30 may form a search-term array 32, a detection array 34, and an activation-routing matrix 36. The search-term array 32 may include a plurality of input conductors 37, each of which may place each of the feature cells 30 in communication with the row decoder 28.

The row decoder 28 may select particular conductors among the plurality of input conductors 37 based on the content of the data stream 12. For example, the row decoder 28 may be a one byte to 256 row decoder that activates one of 256 rows based on the value of a received byte, which may represent one term. A one-byte term of 0000 0000 may correspond to the top row among the plurality of input conductors 37, and a one-byte term of 1111 1111 may correspond to the bottom row among the plurality of input conductors 37. Thus, different input conductors 37 may be selected, depending on which terms are received from the data stream 12. As different terms are received, the row decoder 28 may deactivate the row corresponding to the previous term and activate the row corresponding to the new term.

The detection array 34 may couple to a detection bus 38 that outputs signals indicative of complete or partial satisfaction of search criteria to the aggregation module 24. The activation-routing matrix 36 may selectively activate and deactivate feature cells 30 based on the number of search terms in a search criterion that have been matched.

The aggregation module 24 may include a latch matrix 40, an aggregation-routing matrix 42, a threshold-logic matrix 44, a logical-product matrix 46, a logical-sum matrix 48, and an initialization-routing matrix 50.

The latch matrix 40 may implement portions of certain search criteria. Some search criteria, e.g., some regular expressions, count only the first occurrence of a match or group of matches. The latch matrix 40 may include latches that record whether a match has occurred. The latches may be cleared during initialization, and periodically re-initialized during operation, as search criteria are determined to be satisfied or not further satisfiable—i.e., an earlier search term may need to be matched again before the search criterion could be satisfied.

The aggregation-routing matrix 42 may function similar to the activation-routing matrix 36. The aggregation-routing matrix 42 may receive signals indicative of matches on the detection bus 38 and may route the signals to different group-logic lines 53 connecting to the threshold-logic matrix 44. The aggregation-routing matrix 42 may also route outputs of the initialization-routing matrix 50 to the detection array 34 to reset portions of the detection array 34 when a search criterion is determined to be satisfied or not further satisfiable.

The threshold-logic matrix 44 may include a plurality of counters, e.g., 32-bit counters configured to count up or down. The threshold-logic matrix 44 may be loaded with an initial count, and it may count up or down from the count based on matches signaled by the recognition module. For instance, the threshold-logic matrix 44 may count the number of occurrences of a word in some length of text.

The outputs of the threshold-logic matrix 44 may be inputs to the logical-product matrix 46. The logical-product matrix 46 may selectively generate "product" results (e.g., "AND" function in Boolean logic). The logical-product matrix 46 may be implemented as a square matrix, in which the number of output products is equal the number of input lines from the threshold-logic matrix 44, or the logical-product matrix 46 may have a different number of inputs than outputs. The resulting product values may be output to the logical-sum matrix 48.

The logical-sum matrix 48 may selectively generate sums (e.g., "OR" functions in Boolean logic.) The logical-sum matrix 48 may also be a square matrix, or the logical-sum matrix 48 may have a different number of inputs than outputs. Since the inputs are logical products, the outputs of the logical-sum matrix 48 may be logical-Sums-of-Products (e.g., Boolean logic Sum-of-Product (SOP) form). The output of the logical-sum matrix 48 may be received by the initialization-routing matrix 50.

The initialization-routing matrix 50 may reset portions of the detection array 34 and the aggregation module 24 via the aggregation-routing matrix 42. The initialization-routing matrix 50 may also be implemented as a square matrix, or the initialization-routing matrix 50 may have a different number of inputs than outputs. The initialization-routing matrix 50 may respond to signals from the logical-sum matrix 48 and re-initialize other portions of the pattern-recognition processor 14, such as when a search criterion is satisfied or determined to be not further satisfiable.

The aggregation module 24 may include an output buffer 51 that receives the outputs of the threshold-logic matrix 44, the aggregation-routing matrix 42, and the logical-sum matrix 48. The output of the aggregation module 24 may be transmitted from the output buffer 51 to the CPU 20 (FIG. 1) on the output bus 26. In some embodiments, an output multiplexer may multiplex signals from these components 42, 44, and 48 and output signals indicative of satisfaction of criteria or matches of search terms to the CPU 20 (FIG. 1). In other embodiments, results from the pattern-recognition processor 14 may be reported without transmitting the signals through the output multiplexer, which is not to suggest that any other feature described herein could not also be omitted. For example, signals from the threshold-logic matrix 44, the logical-product matrix 46, the logical-sum matrix 48, or the initialization routing matrix 50 may be transmitted to the CPU in parallel on the output bus 26.

Figure 3:
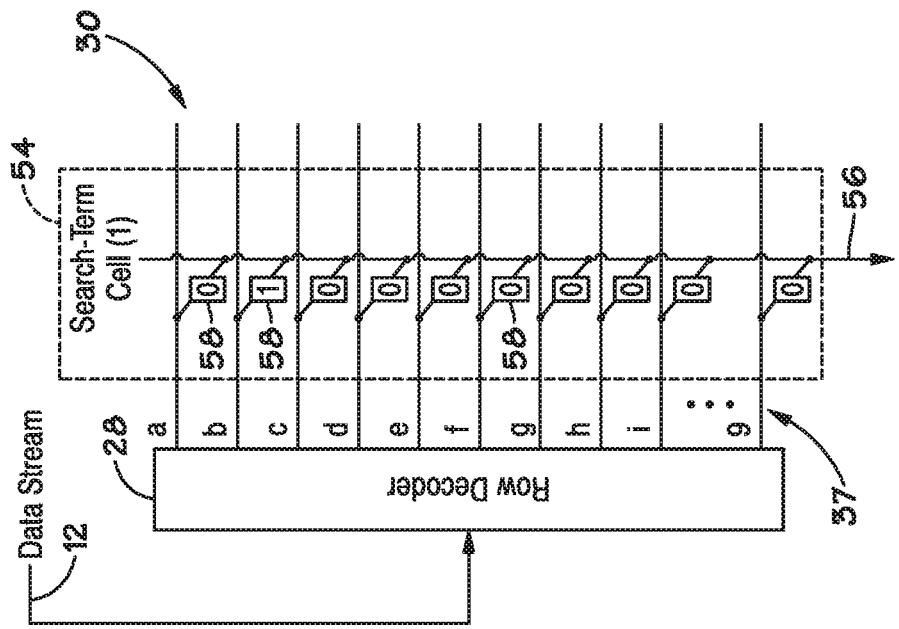
FIG. 3 depicts an example of a search-term cell in the pattern-recognition processor of FIG. 2.

FIG. 3 illustrates a portion of a single feature cell 30 in the search-term array 32 (FIG. 2), a component referred to herein as a search-term cell 54. The search-term cells 54 may include an output conductor 56 and a plurality of memory cells 58. Each of the memory cells 58 may be coupled to both the output conductor 56 and one of the conductors among the plurality of input conductors 37. In response to its input conductor 37 being selected, each of the memory cells 58 may output a value indicative of its stored value, outputting the data through the output conductor 56. In some embodiments, the plurality of input conductors 37 may be referred to as "word lines", and the output conductor 56 may be referred to as a "data line".

The memory cells 58 may include any of a variety of types of memory cells. For example, the memory cells 58 may be volatile memory, such as dynamic random access memory (DRAM) cells having a transistor and a capacitor. The source and the drain of the transistor may be connected to a plate of the capacitor and the output conductor 56, respectively, and the gate of the transistor may be connected to one of the input conductors 37. In another example of volatile memory, each of the memory cells 58 may include a static random access memory (SRAM) cell. The SRAM cell may have an output that is selectively coupled to the output conductor 56 by an access transistor controlled by one of the input conductors 37. The memory cells 58 may also include nonvolatile memory, such as phase-change memory (e.g., an ovonic device), flash memory, silicon-oxide-nitride-oxide-silicon (SONOS) memory, magneto-resistive memory, or other types of nonvolatile memory. The memory cells 58 may also include flip-flops, e.g., memory cells made out of logic gates.

Figure 4:
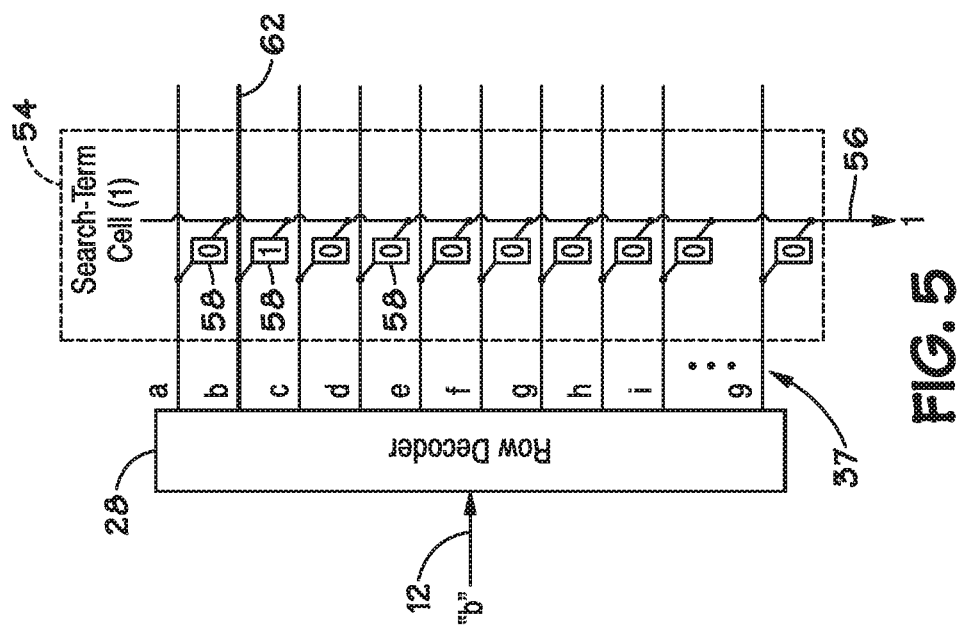
FIGS. 4 and 5 depict the search-term cell of FIG. 3 searching the data stream for a single character.
Figure 5:
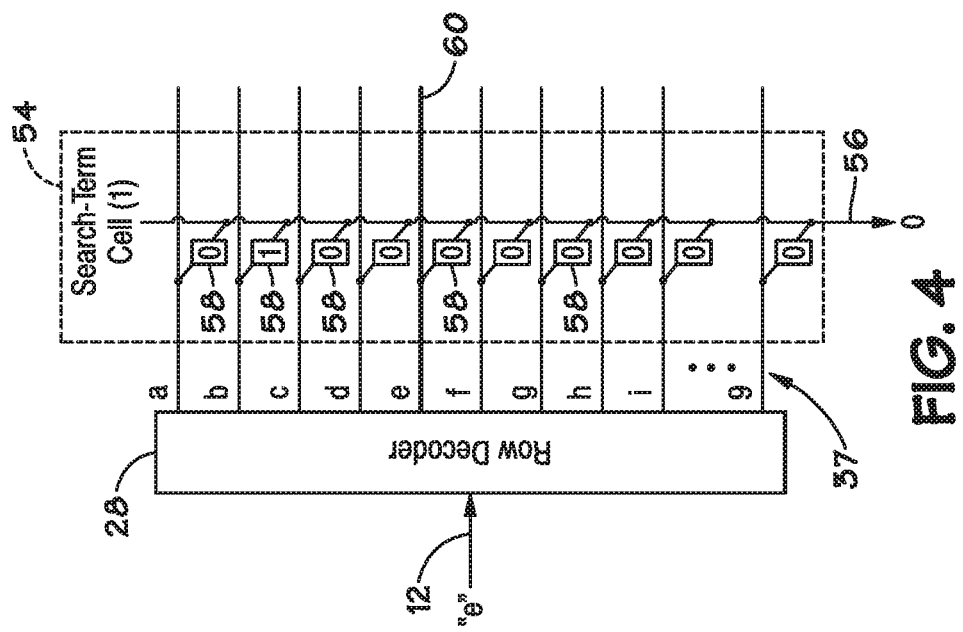

FIGS. 4 and 5 depict an example of the search-term cell 54 in operation. FIG. 4 illustrates the search-term cell 54 receiving a term that does not match the cell's search term, and FIG. 5 illustrates a match.

As illustrated by FIG. 4, the search-term cell 54 may be configured to search for one or more terms by storing data in the memory cells 58. The memory cells 58 may each represent a term that the data stream 12 might present, e.g., in FIG. 3, each memory cell 58 represents a single letter or number, starting with the letter "a" and ending with the number "9". Memory cells 58 representing terms that satisfy the search term may be programmed to store a first value, and memory cells 58 that do not represent terms that satisfy the search term may be programmed to store a different value. In the illustrated example, the search-term cell 54 is configured to search for the letter "b". The memory cells 58 that represent "b" may store a 1, or logic high, and the memory cells 58 that do not represent "b" may be programmed to store a 0, or logic low.

To compare a term from the data stream 12 with the search term, the row decoder 28 may select the input conductor 37 coupled to memory cells 58 representing the received term. In FIG. 4, the data stream 12 presents a lowercase "e". This term may be presented by the data stream 12 in the form of an eight-bit ASCII code, and the row decoder 28 may interpret this byte as a row address, outputting a signal on the conductor 60 by energizing it.

In response, the memory cell 58 controlled by the conductor 60 may output a signal indicative of the data that the memory cell 58 stores, and the signal may be conveyed by the output conductor 56. In this case, because the letter "e" is not one of the terms specified by the search-term cell 54, it does not match the search term, and the search-term cell 54 outputs a 0 value, indicating no match was found.

In FIG. 5, the data stream 12 presents a character "b". Again, the row decoder 28 may interpret this term as an address, and the row decoder 28 may select the conductor 62. In response, the memory cell 58 representing the letter "b" outputs its stored value, which in this case is a 1, indicating a match.

The search-term cells 54 may be configured to search for more than one term at a time. Multiple memory cells 58 may be programmed to store a 1, specifying a search term that matches with more than one term. For instance, the memory cells 58 representing the letters lowercase "a" and uppercase "A" may be programmed to store a 1, and the search-term cell 54 may search for either term. In another example, the search-term cell 54 may be configured to output a match if any character is received. All of the memory cells 58 may be programmed to store a 1, such that the search-term cell 54 may function as a wildcard term in a search criterion.

Figure 6:
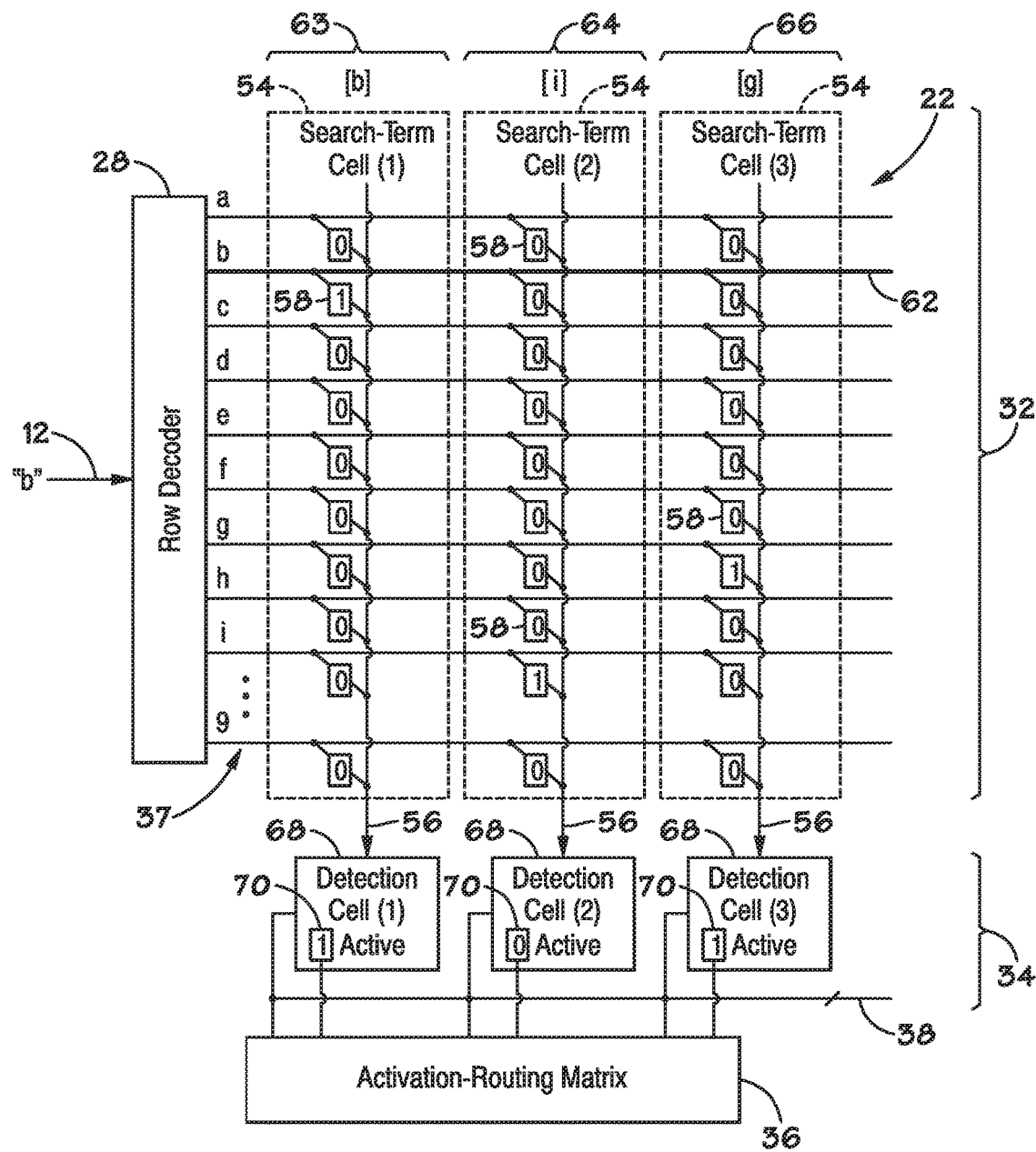
FIGS. 6-8 depict a recognition module including several search-term cells searching the data stream for a word.
Figure 7:
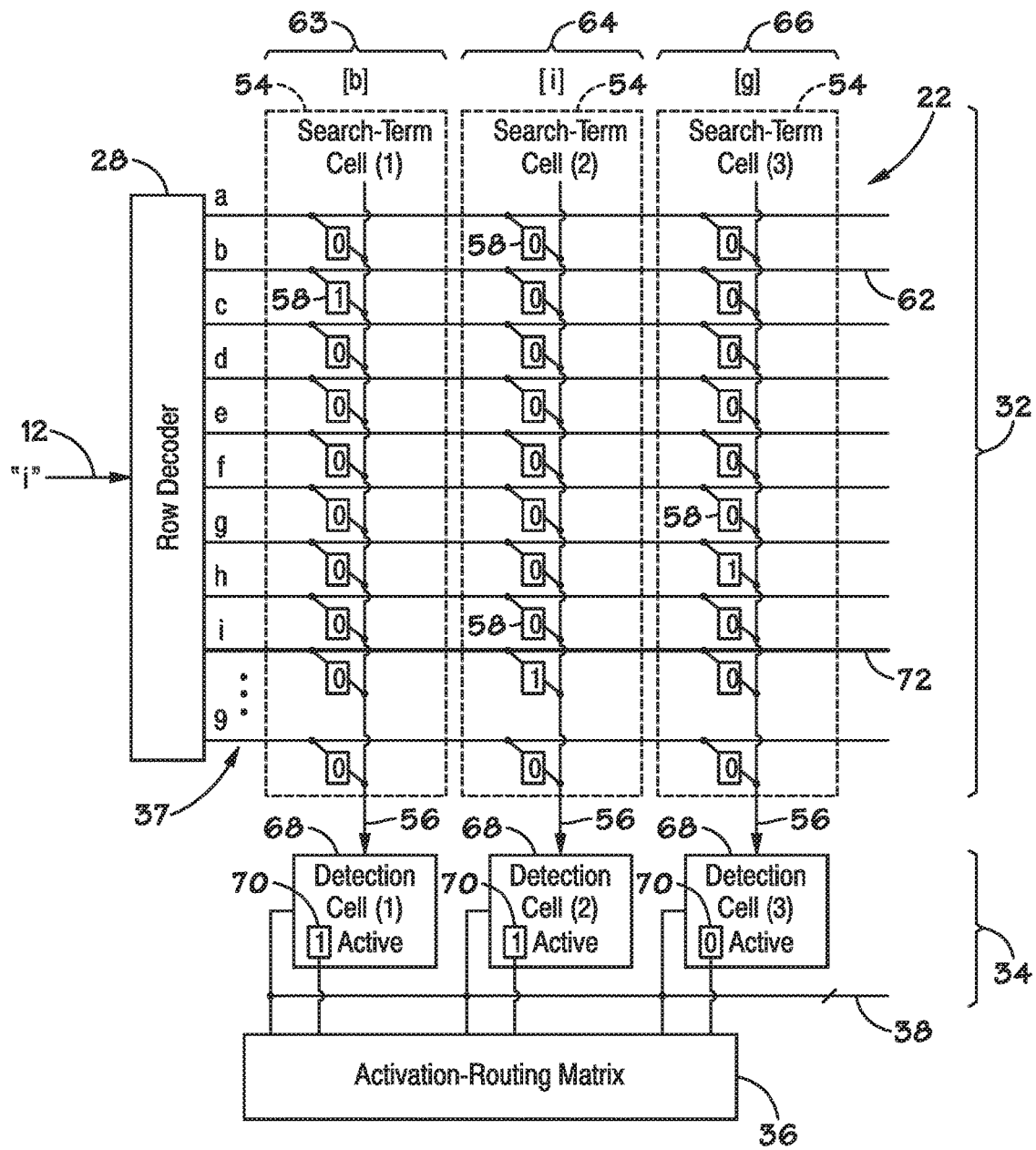
Figure 8:
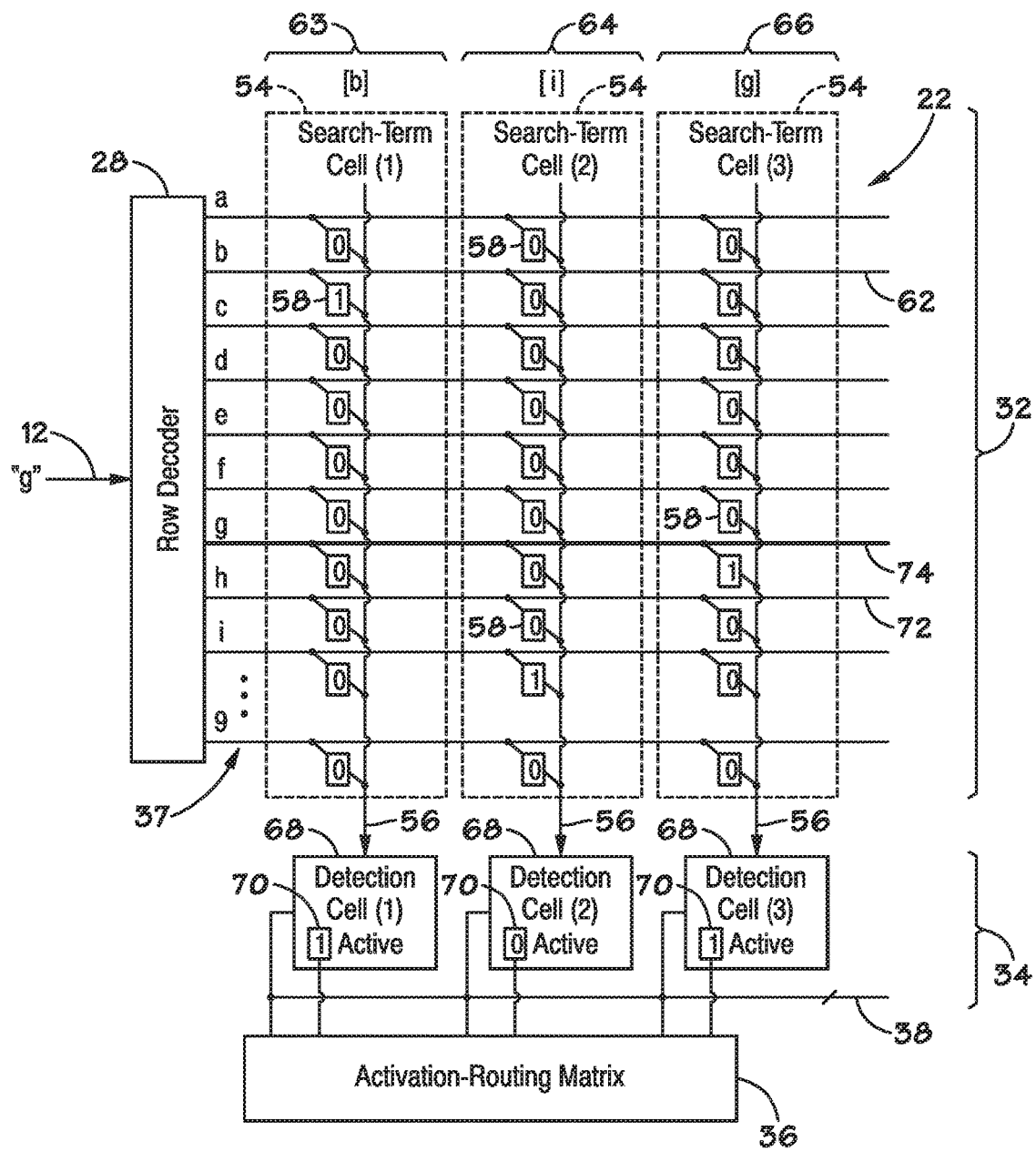

FIGS. 6-8 depict the recognition module 22 searching according to a multi-term search criterion, e.g., for a word. Specifically, FIG. 6 illustrates the recognition module 22 detecting the first letter of a word, FIG. 7 illustrates detection of the second letter, and FIG. 8 illustrates detection of the last letter.

As illustrated by FIG. 6, the recognition module 22 may be configured to search for the word "big". Three adjacent feature cells 63, 64, and 66 are illustrated. The feature cell 63 is configured to detect the letter "b". The feature cell 64 is configured to detect the letter "i". And the feature cell 66 is configured to both detect the letter "g" and indicate that the search criterion is satisfied.

FIG. 6 also depicts additional details of the detection array 34. The detection array 34 may include a detection cell 68 in each of the feature cells 63, 64, and 66. Each of the detection cells 68 may include a memory cell 70, such as one of the types of memory cells described above (e.g., a flip-flop), that indicates whether the feature cell 63, 64, or 66 is active or inactive. The detection cells 68 may be configured to output a signal to the activation-routing matrix 36 indicating whether the detection cell both is active and has received a signal from its associated search-term cell 54 indicating a match. Inactive features cells 63, 64, and 66 may disregard matches. Each of the detection cells 68 may include an AND gate with inputs from the memory cell 70 and the output conductor 56. The output of the AND gate may be routed to both the detection bus 38 and the activation-routing matrix 36, or one or the other.

The activation-routing matrix 36, in turn, may selectively activate the feature cells 63, 64, and 66 by writing to the memory cells 70 in the detection array 34. The activation-routing matrix 36 may activate feature cells 63, 64, or 66 according to the search criterion and which search term is being searched for next in the data stream 12.

In FIG. 6, the data stream 12 presents the letter "b". In response, each of the feature cells 63, 64, and 66 may output a signal on their output conductor 56, indicating the value stored in the memory cell 58 connected to the conductor 62, which represents the letter "b". The detection cells 56 may then each determine whether they have received a signal indicating a match and whether they are active. Because the feature cell 63 is configured to detect the letter "b" and is active, as indicated by its memory cell 70, the detection cell 68 in the feature cell 63 may output a signal to the activation-routing matrix 36 indicating that the first search term of the search criterion has been matched.

As illustrated by FIG. 7, after the first search term is matched, the activation-routing matrix 36 may activate the next feature cell 64 by writing a 1 to its memory cell 70 in its detection cell 68. The activation-routing matrix 36 may also maintain the active state of the feature cell 63, in case the next term satisfies the first search term, e.g., if the sequence of terms "bbig" is received. The first search term of search criteria may be maintained in an active state during a portion or substantially all of the time during which the data stream 12 is searched.

In FIG. 7, the data stream 12 presents the letter "i" to the recognition module 22. In response, each of the feature cells 63, 64, and 66 may output a signal on their output conductor 56, indicating the value stored in the memory cell 58 connected to the conductor 72, which represents the letter "i". The detection cells 56 may then each determine whether they have received a signal indicating a match and whether they are active. Because the feature cell 64 is configured to detect the letter "i" and is active, as indicated by its memory cell 70, the detection cell 68 in the feature cell 64 may output a signal to the activation-routing matrix 36 indicating that the next search term of its search criterion has been matched.

Next, the activation-routing matrix 36 may activate the feature cell 66, as illustrated by FIG. 8. Before evaluating the next term, the feature cell 64 may be deactivated. The feature cell 64 may be deactivated by its detection cell 68 resetting its memory cell 70 between detection cycles or the activation-routing matrix 36 may deactivate the feature cell 64, for example.

In FIG. 8, the data stream 12 presents the term "g" to the row decoder 28, which selects the conductor 74 representing the term "g". In response, each of the feature cells 63, 64, and 66 may output a signal on their output conductor 56, indicating the value stored in the memory cell 58 connected to the conductor 74, which represents the letter "g". The detection cells 56 may then each determine whether they have received a signal indicating a match and whether they are active. Because the feature cell 66 is configured to detect the letter "g" and is active, as indicated by its memory cell 70, the detection cell 68 in the feature cell 66 may output a signal to the activation routing matrix 36 indicating that the last search term of its search criterion has been matched.

The end of a search criterion or a portion of a search criterion may be identified by the activation-routing matrix 36 or the detection cell 68. These components 36 or 68 may include memory indicating whether their feature cell 63, 64, or 66 specifies the last search term of a search criterion or a component of a search criterion. For example, a search criterion may specify all sentences in which the word "cattle" occurs twice, and the recognition module may output a signal indicating each occurrence of "cattle" within a sentence to the aggregation module, which may count the occurrences to determine whether the search criterion is satisfied.

Feature cells 63, 64, or 66 may be activated under several conditions. A feature cell 63, 64, or 66 may be "always active", meaning that it remains active during all or substantially all of a search. An example of an always active feature cell 63, 64, or 66 is the first feature cell of the search criterion, e.g., feature cell 63.

A feature cell 63, 64, or 66 may be "active when requested", meaning that the feature cell 63, 64, or 66 is active when some condition precedent is matched, e.g., when the preceding search terms in a search criterion are matched. An example is the feature cell 64, which is active when requested by the feature cell 63 in FIGS. 6-8, and the feature cell 66, which active when requested by the feature cell 64.

A feature cell 63, 64, or 66 may be "self activated", meaning that once it is activated, it activates itself as long as its search term is matched. For example, a self activated feature cell having a search term that is matched by any numerical digit may remain active through the sequence "123456xy" until the letter "x" is reached. Each time the search term of the self activated feature cell is matched, it may activate the next feature cell in the search criterion. Thus, an always active feature cell may be formed from a self activating feature cell and an active when requested feature cell: the self activating feature cell may be programmed with all of its memory cells 58 storing a 1, and it may repeatedly activate the active when requested feature cell after each term. In some embodiments, each feature cell 63, 64, and 66 may include a memory cell in its detection cell 68 or in the activation-routing matrix 36 that specifies whether the feature cell is always active, thereby forming an always active feature cell from a single feature cell.

Figure 9:
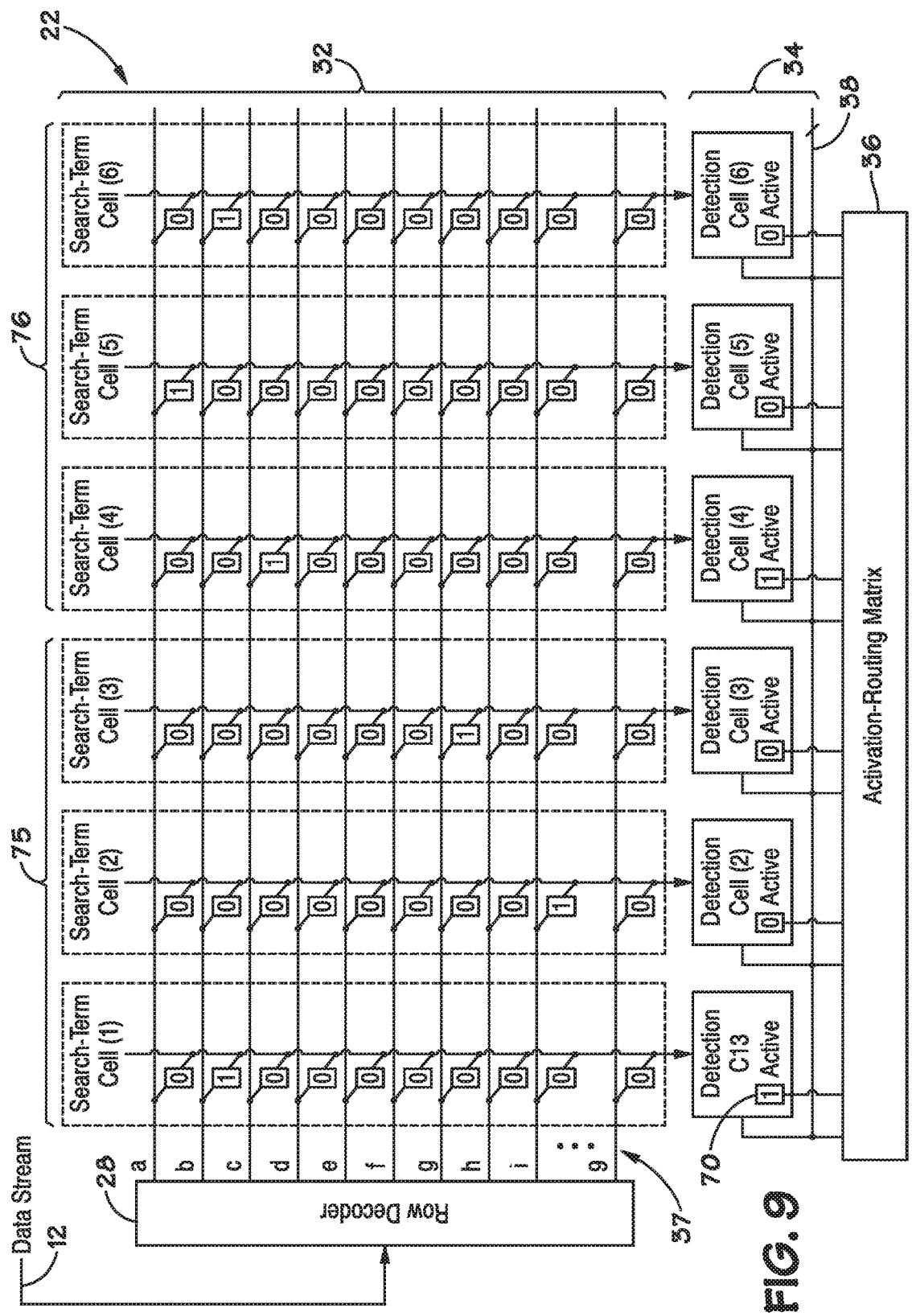
FIG. 9 depicts the recognition module configured to search the data stream for two words in parallel.

FIG. 9 depicts an example of a recognition module 22 configured to search according to a first search criterion 75 and a second search criterion 76 in parallel. In this example, the first search criterion 75 specifies the word "big", and the second search criterion 76 specifies the word "cab". A signal indicative of the current term from the data stream 12 may be communicated to feature cells in each search criterion 75 and 76 at generally the same time. Each of the input conductors 37 spans both of the search criteria 75 and 76. As a result, in some embodiments, both of the search criteria 75 and 76 may evaluate the current term generally simultaneously. This is believed to speed the evaluation of search criteria. Other embodiments may include more feature cells configured to evaluate more search criteria in parallel. For example, some embodiments may include more than 100, 500, 1000, 5000, or 10,000 feature cells operating in parallel. These feature cells may evaluate hundreds or thousands of search criteria generally simultaneously.

Search criteria with different numbers of search terms may be formed by allocating more or fewer feature cells to the search criteria. Simple search criteria may consume fewer resources in the form of feature cells than complex search criteria. This is believed to reduce the cost of the pattern-recognition processor 14 (FIG. 2) relative to processors with a large number of generally identical cores, all configured to evaluate complex search criteria.

Figure 10:
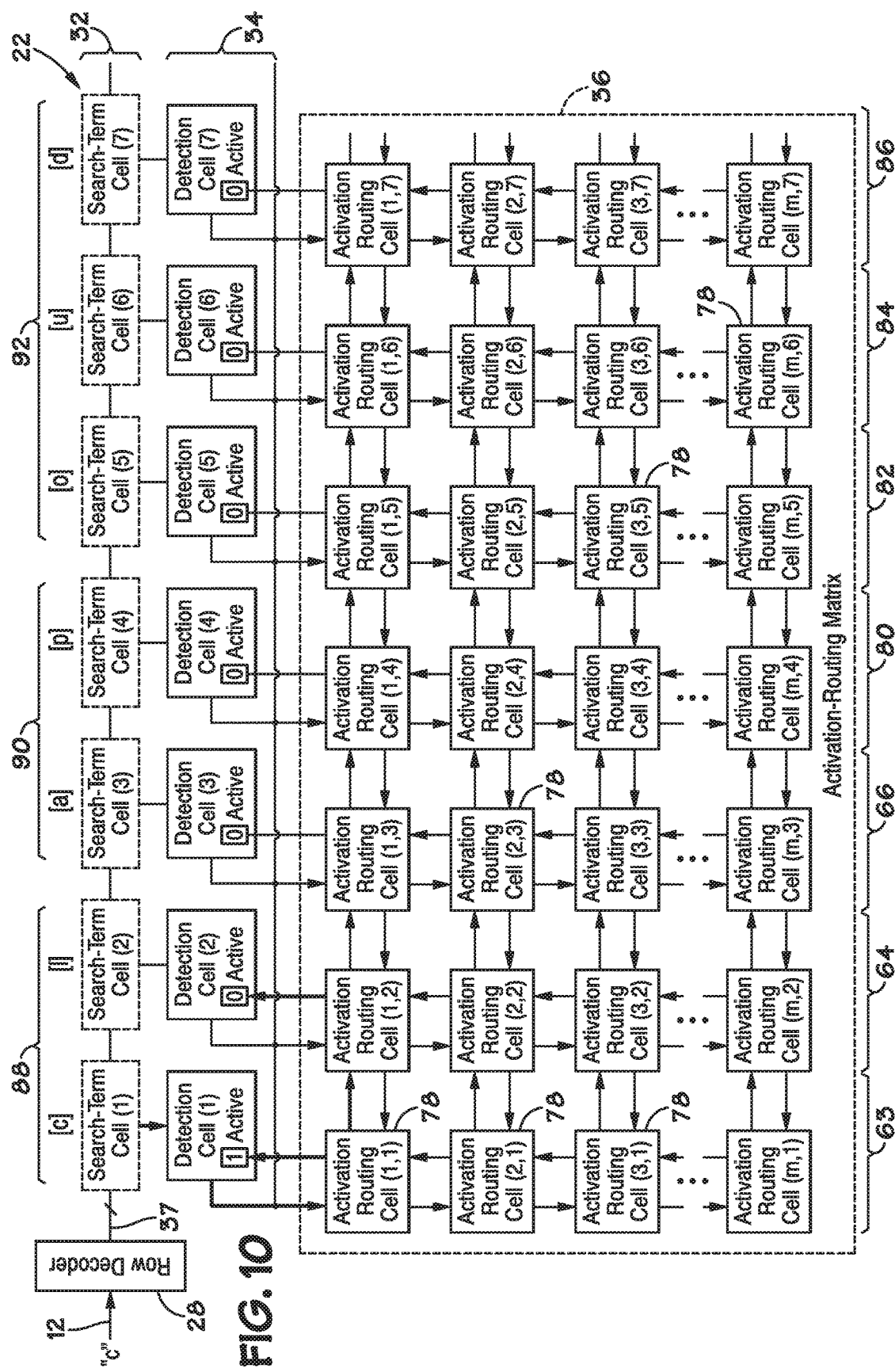
FIGS. 10-12 depict the recognition module searching according to a search criterion that specifies multiple words with the same prefix.
Figure 11:
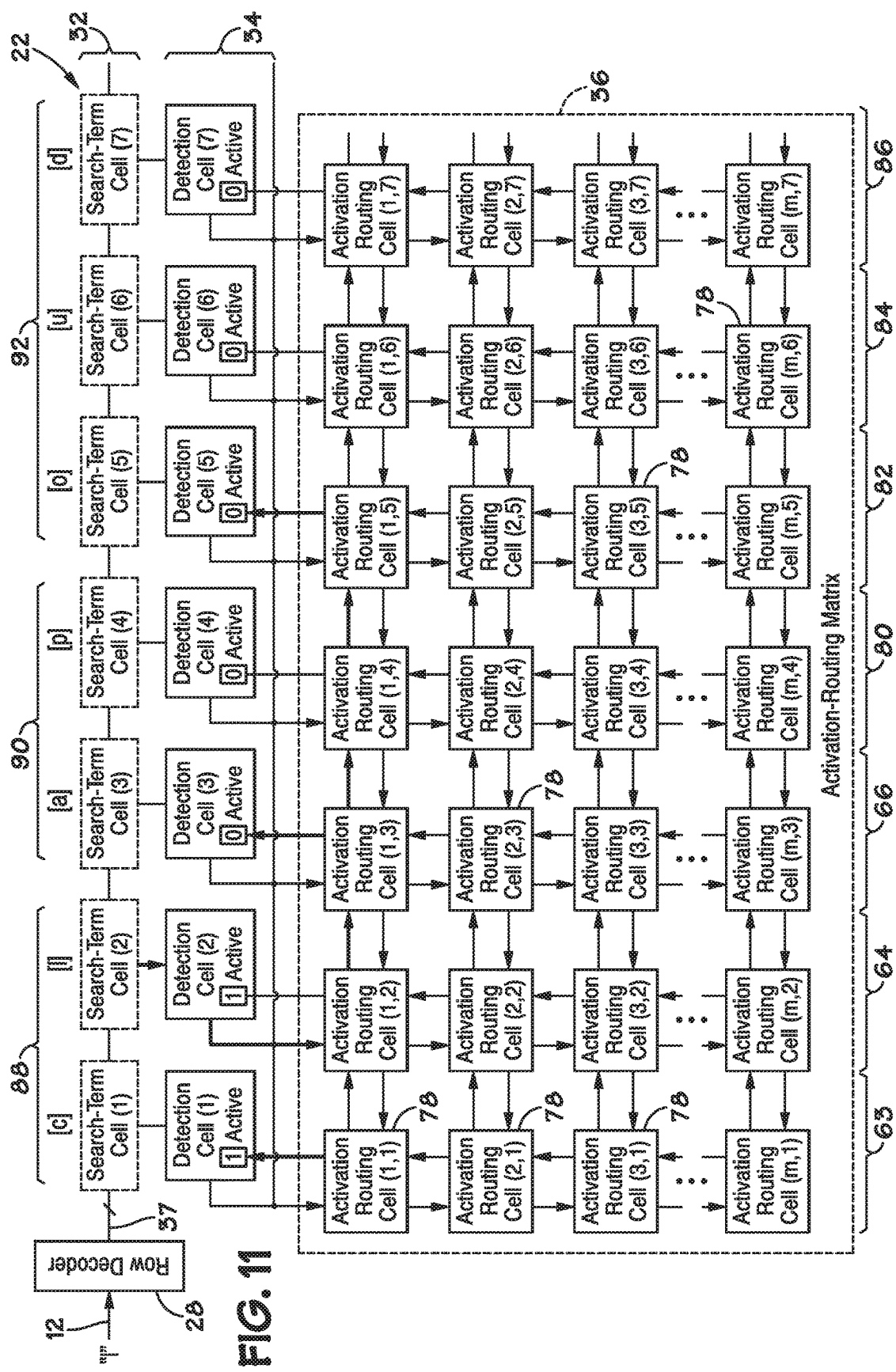
Figure 12:
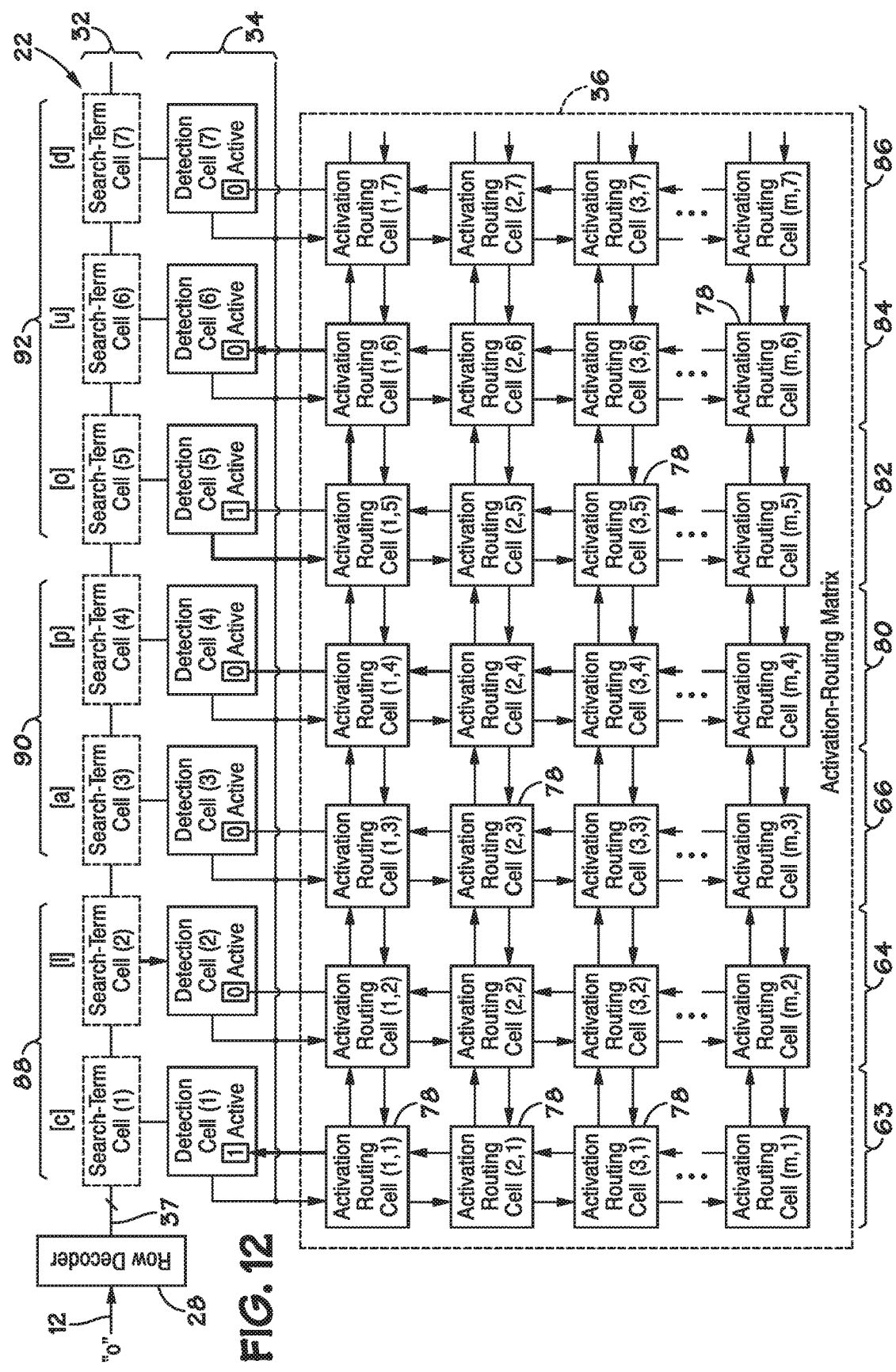

FIGS. 10-12 depict both an example of a more complex search criterion and features of the activation-routing matrix 36. The activation-routing matrix 36 may include a plurality of activation-routing cells 78, groups of which may be associated with each of the feature cells 63, 64, 66, 80, 82, 84, and 86. For instance, each of the feature cells may include 5, 10, 20, 50, or more activation-routing cells 78. The activation-routing cells 78 may be configured to transmit activation signals to the next search term in a search criterion when a preceding search term is matched. The activation-routing cells 78 may be configured to route activation signals to adjacent feature cells or other activation-routing cells 78 within the same feature cell. The activation-routing cells 78 may include memory that indicates which feature cells correspond to the next search term in a search criterion.

As illustrated by FIGS. 10-12, the recognition module 22 may be configured to search according to complex search criteria than criteria that specify single words. For instance, the recognition module 22 may be configured to search for words beginning with a prefix 88 and ending with one of two suffixes 90 or 92. The illustrated search criterion specifies words beginning with the letters "c" and "l" in sequence and ending with either the sequence of letters "ap" or the sequence of letters "oud". This is an example of a search criterion specifying multiple target expressions, e.g., the word "clap" or the word "cloud".

In FIG. 10, the data stream 12 presents the letter "c" to the recognition module 22, and feature cell 63 is both active and detects a match. In response, the activation-routing matrix 36 may activate the next feature cell 64. The activation-routing matrix 36 may also maintain the active state of the feature cell 63, as the feature cell 63 is the first search term in the search criterion.

In FIG. 11, the data stream 12 presents a letter "l", and the feature cell 64 recognizes a match and is active. In response, the activation-routing matrix 36 may transmit an activation signal both to the first feature cell 66 of the first suffix 90 and to the first feature cell 82 of the second suffix 92. In other examples, more suffixes may be activated, or multiple prefixes may active one or more suffixes.

Next, as illustrated by FIG. 12, the data stream 12 presents the letter "o" to the recognition module 22, and the feature cell 82 of the second suffix 92 detects a match and is active. In response, the activation-routing matrix 36 may activate the next feature cell 84 of the second suffix 92. The search for the first suffix 90 may die out, as the feature cell 66 is allowed to go inactive. The steps illustrated by FIGS. 10-12 may continue through the letters "u" and "d", or the search may die out until the next time the prefix 88 is matched.

Figure 13:
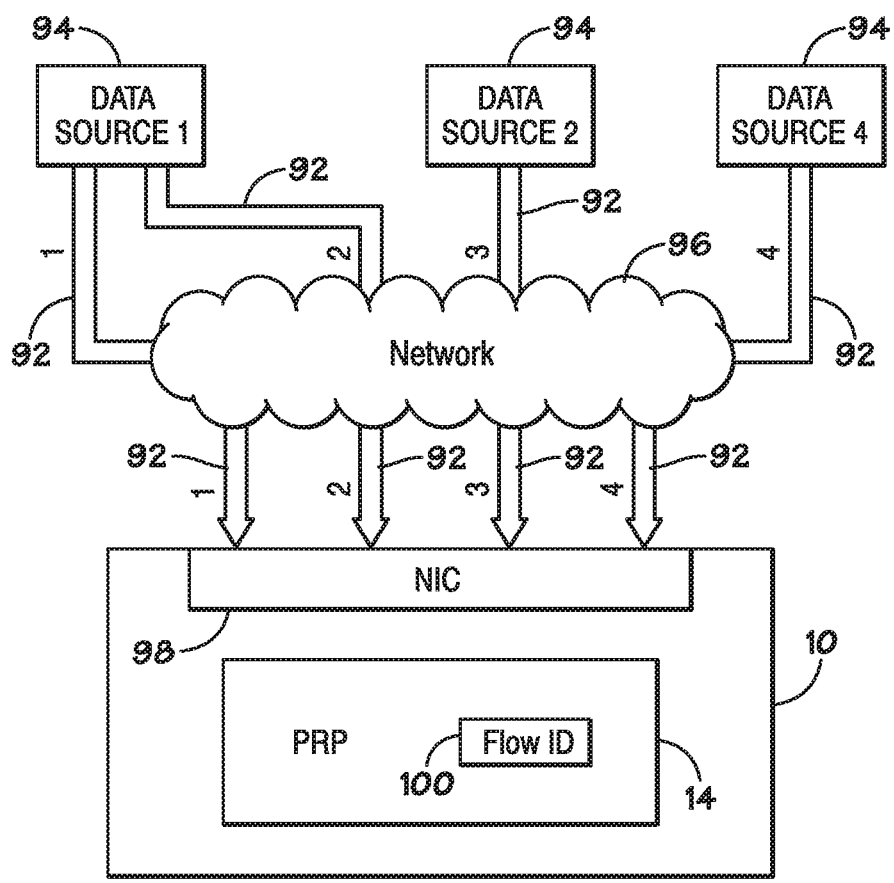
FIG. 13 depicts the system of FIG. 1 receiving a plurality of data streams in accordance with an embodiment of the present invention.

As described above, the pattern recognition processor 14 may be capable of processing the data stream 12. The data stream 12 may include data from a plurality of data streams received by the system 10 and provided to the pattern recognition processor 14. FIG. 13 illustrates the system 10 receiving a plurality of data streams 92 in accordance with an embodiment of the present invention. As shown in FIG. 13, the data streams 92 may be received from one or more data sources 94. For example, data source 1 may provide data stream 1 and data stream 2, data source 2 may provide data stream 3, and data source 4 may provide data stream 4. The data sources 94 may communicate with the system 10 via a network 96. The system 10 that includes the pattern recognition processor may include a network interface card (NIC) 98 or other component to allow communication with the network 96.

The data sources 94 may collectively form a single resource accessible by a user of the system 10. For example, the data sources 94 may each be accessed in response to a request for a web page, wherein each data source 94 corresponds to a different server providing data to the request (e.g., content for the web page, advertisements, etc.). Alternatively, each data source 94 may individually correspond to a different resource, such as multiple web pages, servers such as mail servers, file servers, or any application server, or workstations, such as workstations accessing information through peer-to-peer applications, etc. Regardless of what resource(s) the data sources 94 correspond to, any data stream, such as data streams 1, 2, 3, or 4, may be received and processed by the pattern recognition processor 14. As described above, the streams may be searched for viruses, malware, copyrighted information, or any other data of interest.

In some embodiments, the network 96 may be a network using Transmission Control Protocol/Internet Protocol (TCP/IP), such as is commonly used in the Internet. In such an embodiment, the data streams 92 may be transferred as data packets over the network 96 to the pattern recognition processor 14. In such an embodiment, the packets from each data stream 92 may be mixed (i.e., multiplexed) with other packets from other data sources. That is, although multiple streams 92 are illustrated, the packets from each data stream 92 may be received by the device 10 in a mixed stream of consecutive packets from all data streams 92, such that no two consecutive packet(s) are guaranteed to belong to a single data stream 92. The packets for each data stream 92 may arrive at the NIC of the system 10 in no specific order. The sequence of packets of each data stream 92 may be referred to as data flows (also referred to as "sessions"). A data flow refers to a sequence of related packets to be processed by the pattern-recognition processor 14. Thus, there may be one data flow for each data stream 92 received by the device 10, or there may be multiple data flows processed from one data stream.

Each stream 92, and the flows of packets, may be received by the pattern recognition processor 14 and processed in any order. The processing of the streams 92 and the data flows may also be interleaved, such that processing of a data stream may be stopped and processing may switch to another data stream.

To identify each data flow, the pattern recognition processor 14 may include a "FlowID" register 100. In some embodiments, the FlowID register may be separate from, but accessible by, the pattern recognition processor 14, such as included in another component of the device 10. The FlowID register 100 may store any number of unique flow identifiers that identify a particular data flow. For example, upon receiving a new data flow, the processor 14 may assign a unique flow identifier to the data flow and write the flow identifier to the register 100. The FlowID register 100 may be of any suitable size and the size of the register 100 may be selected based on the number of data flows to be processed. For example, in some embodiments the register 100 may be 8-bits (e.g., capable of storing 256 flow IDs), 16 bits, (e.g., capable of storing 65,536 flow IDs) or 32 bits (e.g., capable of storing 4,294,967,296 flow IDs). In other embodiment, multiple registers may be used to store FlowIDs.

Figure 14:
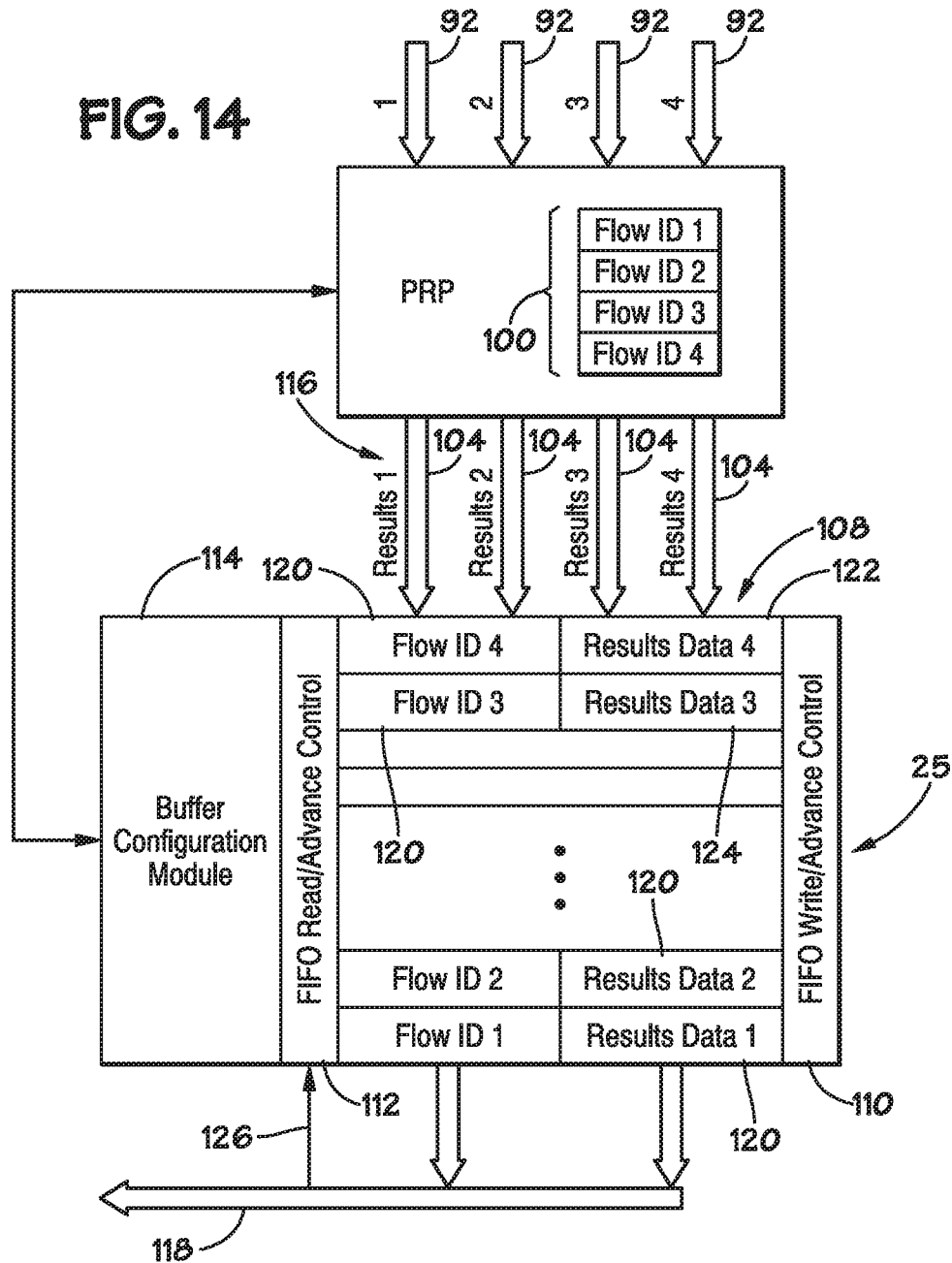
FIG. 14 depicts a data flow identification register and a results buffer of the pattern recognition processor of FIG. 2 in accordance with an embodiment of the present invention.

FIG. 14 depicts processing and output of the data streams 92 in accordance with an output of the present invention. As described above, the pattern recognition processor 14 may receive data streams 92, such as data stream 1, data stream 2, data stream 3, and data stream 4. The packets from each data stream 92 may be processed as a different data flow (i.e., session) of the pattern recognition processor 14. Upon receipt of packets from a data stream 92, the FlowID register 100 may assign a unique FlowID to each flow for each data stream 92. For example, as shown in FIG. 14, the FlowID register 100 may store values FlowID1, FlowID2, FlowID3, and FlowID4 for each data flow of each data stream 1, 2, 3, and 4, respectively.

After processing the data for each data flow, as described above, the pattern recognition processor 14 outputs corresponding results streams 104. Thus, for each data stream 1, 2, 3, or 4, corresponding results stream 1, 2, 3, and 4 may be output from the pattern recognition processor 14. As described above, the results streams 104 may include the results of a search and/or any other functions performed on the data of each data streams 92.

The output from the pattern recognition processor 14 may be provided to the output buffer 51 (FIG. 2). As mentioned above, the output buffer 51 may include the results buffer 25 shown in FIG. 14. The results buffer 25 may include a first-in first-out (FIFO) buffer 108, a buffer-write-control module 110, a buffer-read-control module 112, and a buffer-configuration module 114. The results buffer 25 may be integrally formed as part of the pattern-recognition processor 14 (e.g., on the same body of silicon), or it may be a separate component. The results buffer 25 may receive results data from the pattern-recognition processor 14 through an upstream results bus 116 that transfers the results streams 1, 2, 3, and 4, and the results buffer 25 may output results data to the CPU 20 (FIG. 1) through a downstream results bus 118.

The FIFO buffer 108 may be configured to store a plurality of records 120. Each record 120 may store results data, e.g., data relating to the satisfaction of a criterion. Each record 120 may correspond to one instance of the satisfaction of one criterion, or data relating to the satisfaction of the criterion may be stored in several records 120, e.g., several adjacent or otherwise sequential records 120. The results data may include data such as which criterion was satisfied, the sequence of terms from a respective data stream 92 that satisfied the criterion, a term count (e.g., a bit count) that points to the portion of a respective data stream 92 that satisfied the criterion, or a time period during which the portion of the data stream that satisfied the criterion was received. Each record of the FIFO buffer 94 may also store any other information, such as status information, housekeeping information, etc.

To ensure that the results data stored in the buffer 25 is related to a particular data stream 92, each record 120 of the results buffer 25 may store the results data and the associated flow id for the data stream associated with the results. For example, a first record 122 in the FIFO buffer 108 may include FlowID4 and the results data that relates to data stream 4. Similarly, a second record 124 in the buffer 108 may include FlowID3 and results data 3 that relates to data stream 3. In this manner, each record 120 of the FIFO buffer 108 includes a corresponding flow identifier such that any components downstream of the buffer 25 will be able to identify results data received from the buffer 25 with one of the respective data streams 92.

The buffer-write-control module 110 may be configured to control which data from the upstream results bus 116 is written to a record 120 in the FIFO buffer 94. The buffer-write-control module 110 may include a counter that increments or decrements each time a criterion is satisfied or each time results data is written to a new record. The buffer-write-control module may also include memory that indicates which record 120 was most recently output to the CPU 20, and the buffer-write-control module 110 may be configured to write data from the upstream results bus 116 to records 120 containing data that has already been conveyed to the CPU 20.

Similarly, the buffer-read-control module 112 may be configured to indicate which record 120 is the oldest record that has not been read from the FIFO buffer 108. For example, the buffer-read-control module 112 may include a counter that increments or decrements each time a record is read from the FIFO buffer 108, and the count of the counter may identify the oldest unread record 120. The buffer-read-control module 112 may be configured to receive a read command signal 126 from the CPU 20 and to respond to the read command by causing the FIFO buffer 108 to output the data stored by the oldest unread record 120.

Figure 15:
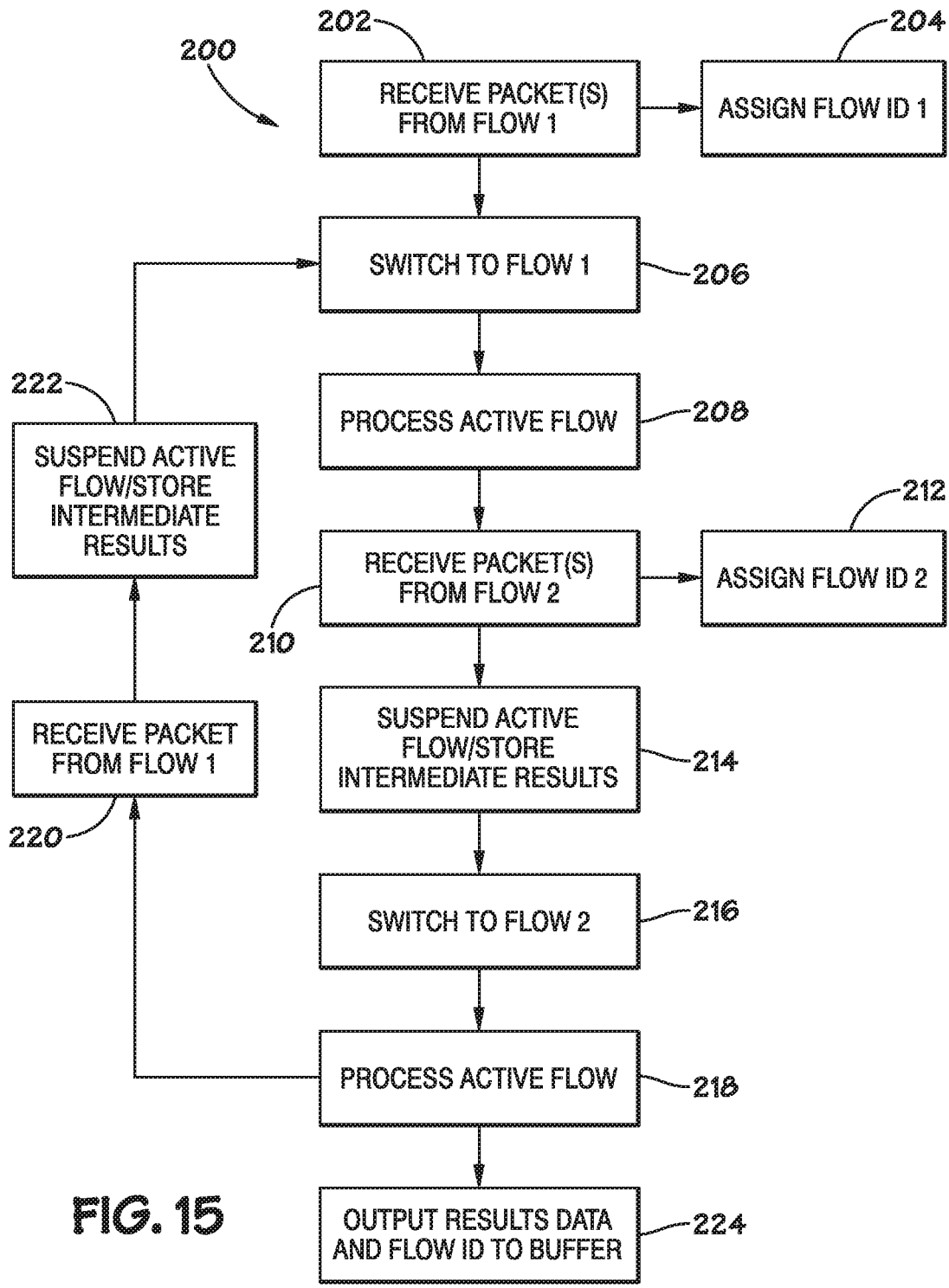
FIG. 15 is a flowchart of a process for processing multiple data flows in the pattern recognition processor of FIG. 2 in accordance with an embodiment of the present invention.

FIG. 15 is a flowchart depicting a process 200 for processing multiple data flows in an embodiment of the pattern recognition processor 14. As described above, the pattern recognition processor 14 of the device 10 may receive data packet(s) of a first data flow that may correspond to data stream 1 (block 202), such as received by the NIC 98 of the device 10. The pattern recognition processor 14 may assign a flow ID to the first data flow and write the flow ID to the Flow ID register 100 (block 204). The pattern recognition processor 14 then switches to flow 1, e.g., the data flow identified by the first flow ID, as the active flow (block 206) and processes the active flow (block 208), such as by searching the flow for satisfaction of a criterion.

Subsequent packet(s) received by device 10 and the pattern recognition processor 14 may belong to a second data flow that may correspond to data stream 2. The pattern recognition processor 14 may receive the packet(s) of the second data flow (block 210) and assign a second flow ID for the second data flow (block 212) and write the flow Id to the Flow ID register 100. Because the incoming packets belong to another data flow, the pattern recognition processor 14 may switch to searching the packets of the second data flow. The pattern recognition processor 14 may suspend processing of the active flow, e.g., the first data flow having the first flow ID, and store the intermediate results of the active flow (block 214). The processor 14 may then switch to the second data flow as the active flow (block 216) and process the new active flow (block 218), e.g., the second data flow having the second flow ID.

The switching of data flows may be performed anytime another packet(s) is received for another data flow. For example, in the process 200, another data packet(s) from the first data flow, Flow 1, may be received (block 220). The processor 14 may suspend processing of the currently active flow (block 222), i.e., Flow 2, and switch to processing Flow 1. The processor 14 may continue processing Flow 1 until additional packet(s) of another data flow are received.

After the processing of the Flow 1, Flow 2, or both, has completed, the results data for each data flow may be output to the results buffer 25, as described above (block 224). The results data for Flow 1, as well as the Flow ID for Flow 1, may be output to the buffer 25 and stored in the FIFO buffer 108. Similarly, the results data for Flow 2 and the corresponding Flow ID may be output to the buffer 25 and stored in the FIFO buffer 108. It should be appreciated that the process 200 described above may be implemented for any number of data flows, e.g., data streams 92, received by the device 10 and processed by the pattern recognition processor 14. Each incoming packet(s) from a data flow, may be assigned a new flow ID and the processor 14 may switch to processing that data flow.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A system, comprising:
a register accessible by a pattern-recognition processor and when in operation stores a plurality of identifiers, wherein each identifier corresponds to a respective one data flow of a plurality of interleaved data flows received by the pattern-recognition processor to allow for switching of processing of a first data flow of the plurality of interleaved data flows by the pattern-recognition processor to processing of a second data flow of the plurality of interleaved data flows by the pattern-recognition processor, wherein each of the plurality of interleaved data flows comprises a plurality of data packets; and
an output buffer comprising a results buffer when in operation stores a record of a plurality of records corresponding to each data flow of the plurality of interleaved data flows having completed processing as results data, wherein the output buffer when in operation stores intermediate processing results data of the first data flow generated prior to generation of the results data of the first data flow when the pattern-recognition processor receives the second data flow and switches from processing of the first data flow to processing of the second data flow, wherein the output buffer when in operation transmits the intermediate processing results data of the first data flow to the pattern-recognition processor to resume processing of the first data flow when the pattern-recognition processor receives a portion of the first data flow subsequent to receiving the second data flow.

2. The system of claim 1, comprising the results buffer when in operation stores the results data of the first data flow and the identifier corresponding to the first flow.

3. The system of claim 1, wherein the register comprises one of an 8-bit register, a 16-bit register, or a 32-bit register.

4. The system of claim 1, comprising a plurality of data sources that provide the plurality of interleaved data flows.

5. The system of claim 4, wherein the each of the plurality of data sources comprises a server that provides data.

6. The system of claim 1, comprising a first data source that provides the plurality of interleaved data flows.

7. The system of claim 1, comprising a network that transfers the plurality of interleaved data flows to the pattern-recognition processor.

8. The system of claim 7, comprising the pattern-recognition processor and a network device coupled to the pattern-recognition processor to communicate with the network.

9. The system of claim 1, comprising the pattern-recognition processor, wherein the register is integrally formed as part of the pattern-recognition processor.

10. A device, comprising:
a buffer accessible by a pattern-recognition processor and when in operation stores a plurality of records, wherein each record stores the results data of a plurality of interleaved data flows having completed processing by the pattern-recognition processor and an identifier associating results data with one of the plurality of interleaved data flows to allow for switching of processing of a first data flow of the plurality of interleaved data flows by the pattern-recognition processor to processing of a second data flow of the plurality of interleaved data flows by the pattern-recognition processor, wherein each of the plurality of interleaved data flows comprises a plurality of data packets, wherein the buffer when in operation stores intermediate processing results data of the first data flow generated prior to generation of the results data of the first data flow when the pattern-recognition processor receives the second data flow and switches from processing of the first data flow to processing of the second data flow, wherein the buffer when in operation transmits the intermediate processing results data of the first data flow to the pattern-recognition processor to resume processing of the first data flow when the pattern-recognition processor receives a portion of the first data flow subsequent to receiving the second data flow.

11. The device of claim 10, wherein the buffer comprises a first-in first-out (FIFO) buffer.

12. The device of claim 10, wherein the buffer comprises a write-control module when in operation writes in the results data to the plurality of records and a read control module when in operation reads data from the plurality of records.

13. The device of claim 10, wherein the buffer is integrally formed as part of the pattern-recognition processor.

14. The device of claim 10, wherein the buffer is separate from the pattern-recognition processor.

15. The device of claim 10, wherein each of the plurality of records stores results data comprising satisfaction of a search criterion.

16. The device of claim 10, wherein two or more sequential records of the plurality of records store results data comprising satisfaction of a search criterion.

17. The device of claim 10, wherein the results data comprises satisfaction of a search criterion, a sequence of terms from one of the plurality of interleaved data flows that satisfied the search criterion, the identifier that identifies the portion of one of the plurality of interleaved data flows that satisfied the search criterion, a time period for which the portion of one of the plurality of interleaved data flows satisfied the search criterion, or any combination thereof.

18. A method, comprising:
storing, in a register accessible by a pattern-recognition processor, a plurality of identifiers, wherein each identifier corresponds to a respective one data flow of a plurality of interleaved data flows received by the pattern-recognition processor to allow for switching of processing of a first data flow of the plurality of interleaved data flows by the pattern-recognition processor to processing of a second data flow of the plurality of interleaved data flows by the pattern-recognition processor, wherein each of the plurality of interleaved data flows comprises a plurality of data packets;

storing, in an output buffer, a record of a plurality of records corresponding to each data flow of the plurality of interleaved data flows having completed processing as results data;

storing, in the output buffer, intermediate processing results data of the first data flow generated prior to generation of the results data of the first data flow when the pattern-recognition processor receives the second data flow and switches from processing of the first data flow to processing of the second data flow; and transmitting, from the output buffer, the intermediate processing results data of the first data flow to the pattern-recognition processor to resume processing of the first data flow when the pattern-recognition processor receives a portion of the first data flow subsequent to receiving the second data flow.

19. The method of claim 18, comprising transmitting the results data to a processor coupled to the pattern-recognition processor.

* * * * *